United States Patent
Whitaker

(10) Patent No.: US 11,779,823 B2
(45) Date of Patent: Oct. 10, 2023

(54) TEAM ROPING APPARATUS

(71) Applicant: Dustin B Whitaker, Childress, TX (US)

(72) Inventor: Dustin B Whitaker, Childress, TX (US)

( * ) Notice: Subject to any disclaimer, the term of this patent is extended or adjusted under 35 U.S.C. 154(b) by 442 days.

(21) Appl. No.: 16/795,323

(22) Filed: Feb. 19, 2020

(65) Prior Publication Data
US 2021/0252364 A1     Aug. 19, 2021

(51) Int. Cl.
*A63B 69/00* (2006.01)
*A01K 15/04* (2006.01)
*A63B 69/04* (2006.01)

(52) U.S. Cl.
CPC .......... *A63B 69/0068* (2013.01); *A01K 15/04* (2013.01)

(58) Field of Classification Search
CPC .... A63B 69/0068; A01K 15/04; B65G 35/00; A63K 1/02; A63K 3/00
See application file for complete search history.

(56) References Cited

U.S. PATENT DOCUMENTS

| | | | | |
|---|---|---|---|---|
| 4,138,966 | A * | 2/1979 | Hesnault | A01K 15/027 119/701 |
| 4,286,788 | A * | 9/1981 | Simington | A63B 69/0068 273/359 |
| 5,938,564 | A * | 8/1999 | Bachman | A63K 1/02 482/3 |
| 6,715,425 | B1 * | 4/2004 | Dore | B61B 13/04 463/58 |
| 8,322,489 | B1 * | 12/2012 | Denison | A62B 5/00 182/103 |
| 2003/0034613 | A1 * | 2/2003 | Tisdell | A63B 69/0068 273/359 |
| 2004/0101811 | A1 * | 5/2004 | Gipson | A63B 69/0068 434/247 |
| 2015/0145210 | A1 * | 5/2015 | Bundy | A63B 69/0068 273/359 |

* cited by examiner

*Primary Examiner* — John E Simms, Jr.
(74) *Attorney, Agent, or Firm* — Shannon Warren

(57) ABSTRACT

Embodiments of the present invention disclose a team roping assembly for assisting a heeler to practice team roping without a header. The assembly includes a track having a curved portion located between a first straight portion and a second straight portion, a barrier coupled along the track, a trolley coupled to the track wherein the trolley is permitted to translate along the track, and a tether that couples a horn wrap of a steer to the trolley. Other embodiments include a drive motor assembly coupled proximately to an end of the track that pulls the trolley along the track.

14 Claims, 3 Drawing Sheets

TEAM ROPING APPARATUS

BACKGROUND OF THE INVENTION

1. Field of the Invention

The present application relates to training equipment, and more particularly to the specialization of team roping.

2. Description of Related Art

Team roping, also known as "heading and heeling", is a timed rodeo event that features a steer and two mounted riders. The first rider (the "Header") ropes the steer's head (ideally by the horns), "dallies" the rope by wrapping the end of the rope around a saddle horn of the header, and pulls the steer into a turned path. The second rider (the "Heeler") then ropes the steer by its hind legs as the steer arcs left, dallies the rope to the saddle horn of the heeler, and stops the heeler's horse. Once both ropes are tight and the steer is immobilized, time for the capture is recorded.

Due to the competitive nature of the sport, contestants frequently practice their roping skills for timing and accuracy. However, since the sport requires two riders, it can be difficult for the heeler to practice if the header is unavailable. Various kinds of mechanical roping steers have been developed for assisting a heeler to practice by themselves, however, these devices are stationary practicing devices and/or lack a degree of unpredictability in their mechanical nature in comparison to an actual steer. Therefore, it is desired to develop a roping training assembly that permits a heeler to train roping skills alone with a steer in an environment that simulates a header pulling the steer into a leftward arc.

BRIEF SUMMARY OF THE INVENTION

It is an object of the present application to provide a team roping assembly for assisting a heeler to practice team roping without a header, the team roping assembly comprising: a track having a curved portion located between a first straight portion and a second straight portion, a barrier coupled along the track, a trolley coupled to the track wherein the trolley is permitted to translate along the track, and a tether that couples a horn wrap of a steer to the trolley.

Another object of the present application is to provide a team roping assembly alternatively having a drive motor assembly coupled proximately to an end of a track of the team roping assembly, the drive motor assembly pulling the trolley along the track.

Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the various purposes of the present design. It is important, therefore, that the claims be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
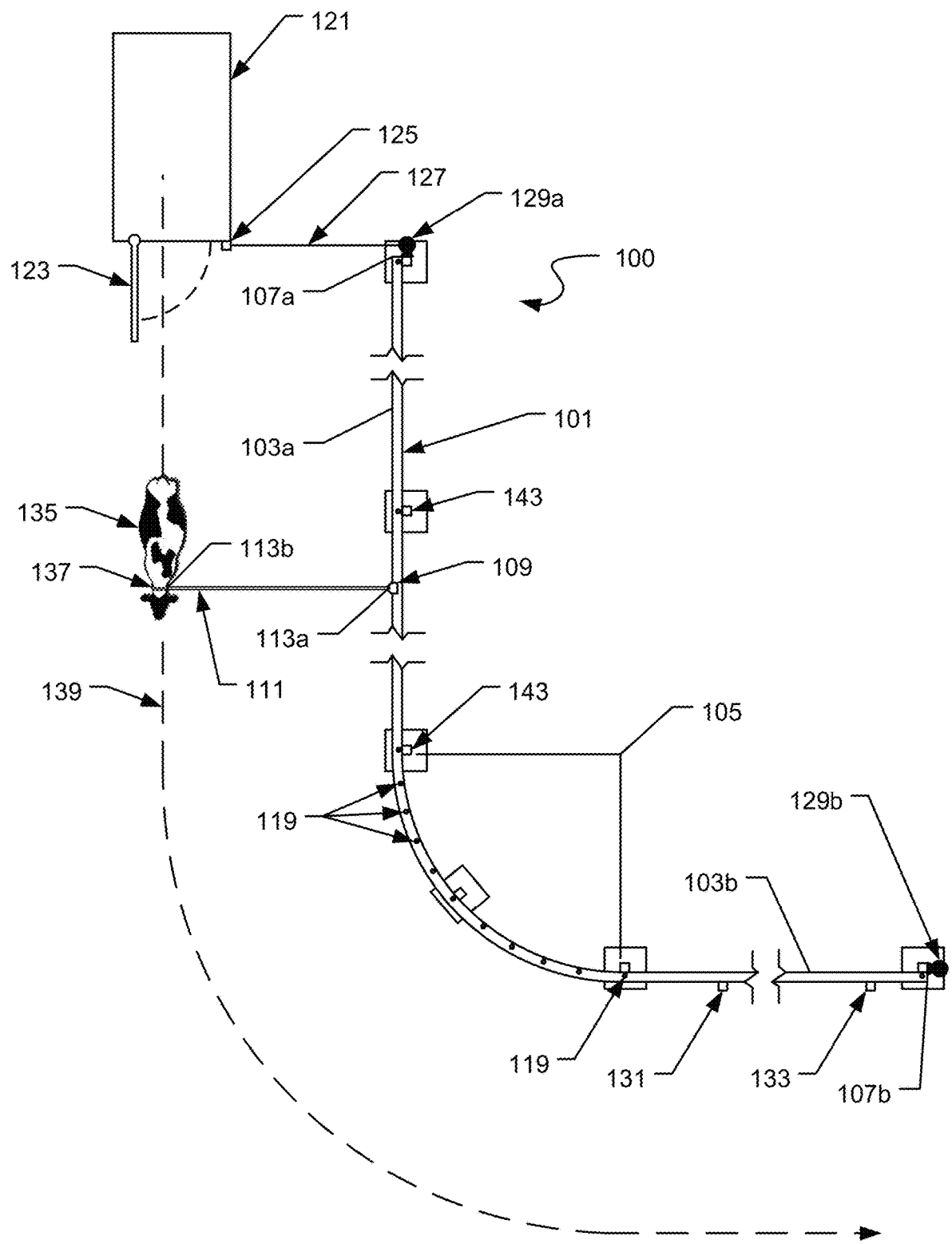
FIG. 1 is a top view of a team roping assembly that leads a steer into an arced path for heeler practice, in accordance with an embodiment of the present invention.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The assembly and method in accordance with the present invention overcomes one or more of the above-discussed problems associated with a rider practicing heeler roping without a header. In particular, the system of the present invention is a team roping assembly having a track, a trolley configured to translate along the track, and a tether connecting between the trolley and a horn wrap of a steer such that the track and trolley restrict a steer to a path that simulates a header pulling the steer for team roping, thus allowing the heeler to practice heeling with the steer without the need for a header. The system may optionally employ a plurality of pullies, a drive motor, and a cable connected to the trolley wherein the drive motor is configured to reel in the cable, thus pulling the trolley from a first end to a second end of the track such that the trolley leads the steer along the path that corresponds to the track. Furthermore, the system may optionally have the drive motor configured to reset the trolley by retracting the trolley back to the first end.

The system will be understood from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application is illustrated in the associated drawings. As used herein, "system" and "assembly" are used interchangeably. It should be noted that the articles "a", "an", and "the", as used in this specification, include plural referents unless the content clearly dictates otherwise. Additional features and functions are illustrated and discussed below.

Figure 2:
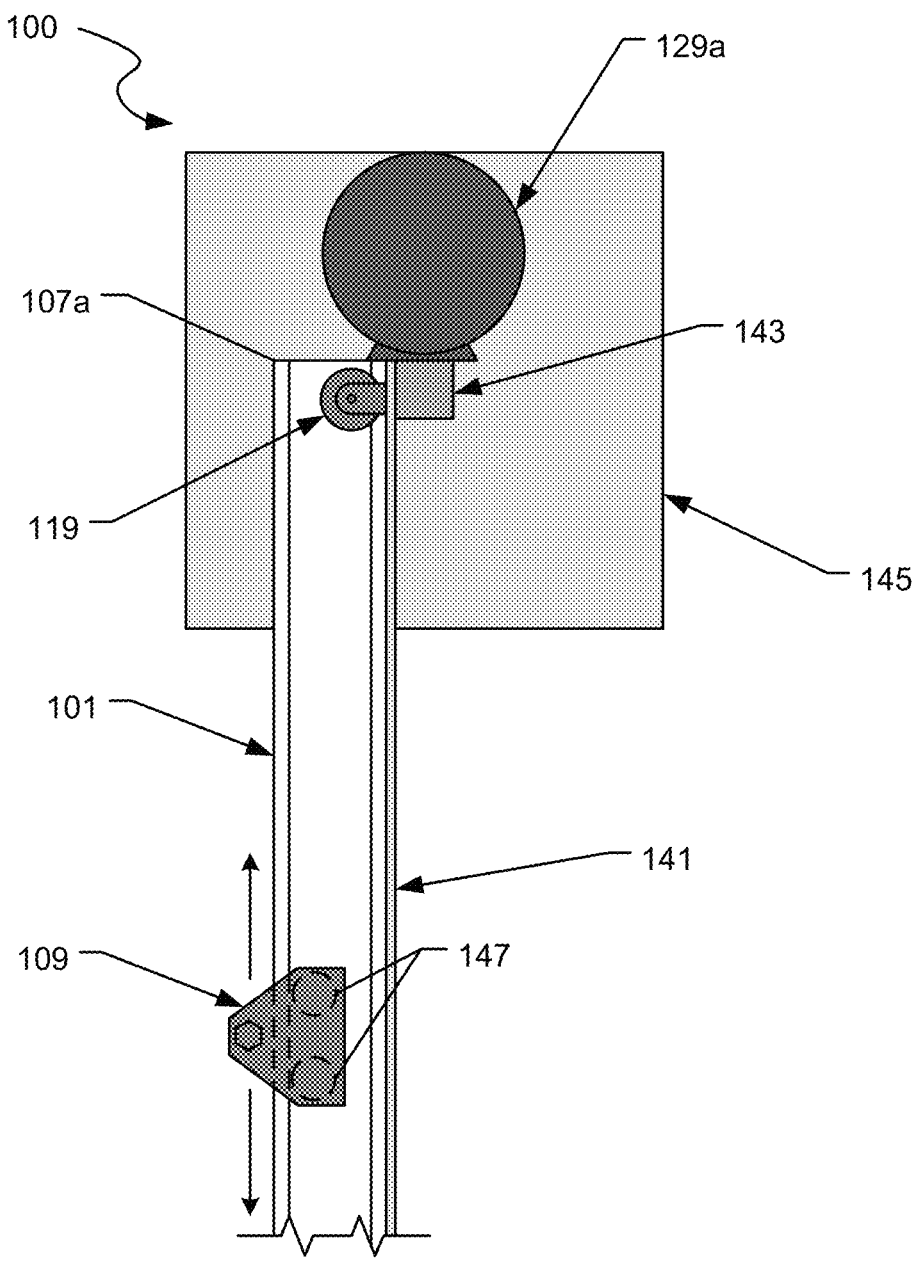
FIG. 2 is a detailed top view of a track end of the team roping assembly of FIG. 1.
Figure 3:
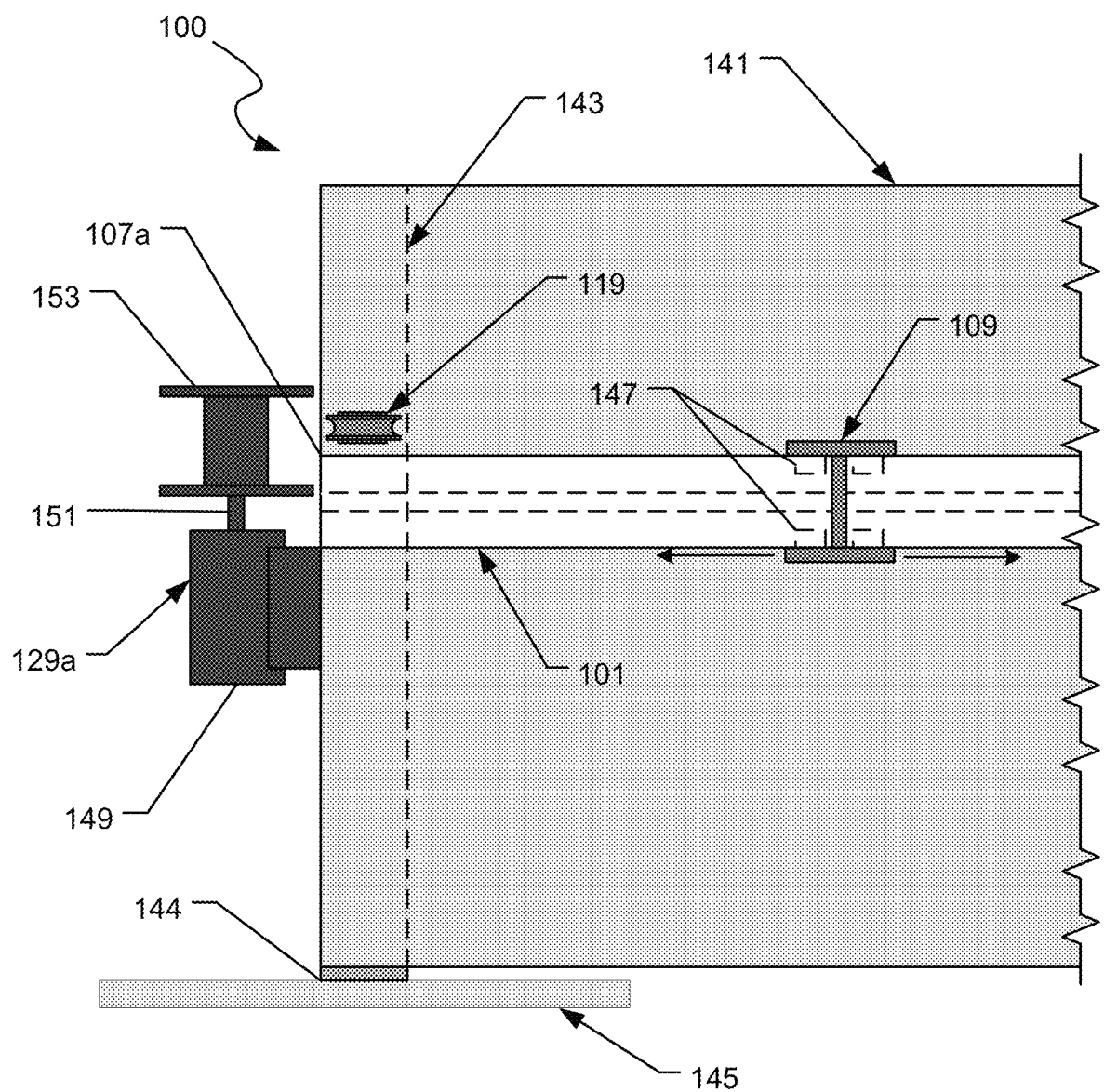
FIG. 3 is a detailed side view of an end of the team roping assembly of FIG. 1.

Referring now to the drawings wherein like reference characters identify corresponding or similar elements in form and function throughout the several views. FIG. 1 is a top view of a team roping assembly that leads a steer into an arced path for heeler practice. FIGS. 2 and 3 are various detailed views of a track end of the team roping assembly of FIG. 1.

Referring now to FIG. 1, a top view of team roping assembly 100 that leads a steer into an arced path for heeler practice is illustrated in accordance with an embodiment of the present invention. Team roping assembly 100 is further referred to as roping assembly 100.

In general, roping assembly 100 has a track, a barrier coupled along the track, a trolley coupled to the track such that the trolley is configured to translate along the track, and a tether that couples a horn wrap of a steer to the trolley. The barrier is further depicted and described with respect to FIGS. 2 and 3.

In FIG. 1, roping assembly 100 has track 101 having straight portions 103a and 103b along with curved portion 105 located between straight portions 103 and 103b. In general, track 101 is any track capable of restricting a trolley to translational motion along the track. In an exemplary embodiment, track 101 is an I-beam. During team roping, a header traditionally pulls a steer towards a left side of the steer. Similarly, track 101 is configured to have an L-shape to correspond to a leftwards path (i.e., path 139), relative to the steer, generally taken by a steer while roped by a header during team roping. In this figure, steer 135 is restricted along path 139 by the L-shape of track 101. The curve of the track to form the L-shape (i.e., curved portion 105) may assume various curvature. For instance, curved portion 105 can be, but is not limited to, a portion of a circular curve, portion of an elliptical curve, or a portion of a parabolic curve. A plurality of posts (i.e., posts 143) are coupled to track 101 to structurally support track 101.

While steer 135 is generally understood to be a steer, it should be appreciated that steer 135 can also be any bovine animal.

Trolley 109 is a trolley that is coupled to track 101 and is configured to translate along track. Trolley 109 may have roller bearings that permit translation along track 101. Trolley 109 is further depicted and illustrated in FIGS. 2 and 3.

Tether 111, having ends 113a and 113b, couples a horn wrap of steer 135 to trolley 109 to restrict the path of steer 135 to correlate to the shape of track 101. End 113a is coupled to trolley 109, and end 113b is coupled to horn wrap 137 of steer 135. Tether 111 may be a solid bar, a chain, a rope, or any other elongated member capable of coupling horn wrap 137 to trolley 109. In an exemplary embodiment, tether 111 is approximately 10 feet long. In general, horn wrap 137 is any horn wrap traditionally used for team roping. Horn wraps are protective wraps that go around a set of horns of the steer to prevent rope burns and are used to reduce the risk of a horn breaking when roped. Tether 111 may be configured to selectively decouple end 113a from trolley 109 or end 113b from 137. Tether 111 may be configured to decouple in response to passing a sensor or a mechanical trigger. For example, tether 111 decouples at end 113a from trolley 109 in response to passing sensor 131.

Optionally, roping assembly 100 may have a drive motor assembly located proximately at an end of track 101, wherein the drive motor assembly pulls trolley 109 to an end of the track using a cable coupled to trolley 109. For example, in FIG. 1, drive motor assembly 129a is located proximate to end 107a of track 101. Alternatively, drive motor assembly 129b is located proximate to end 107b of track 101. Even further, roping assembly 100 may have drive motor 129a located at end 107a and drive motor assembly 129b located at end 107b.

In general, a drive motor assembly includes, but is not limited to, a variable drive motor having a motor shaft, and a cable spool coupled to the motor shaft wherein the cable spool is further coupled to the trolley via a cable. When engaged, drive motor assembly pulls trolley 109 by retracting the cable into the cable spool by the motor drive reeling the cable spool via the motor shaft. Drive motor assembly is further depicted and described with regards to FIGS. 2 and 3. Furthermore, roping assembly 100 may optionally have a plurality of pullies (i.e., pullies 119) to facilitate the cable coupling between the cable spool and trolley 109. The pullies 119 are located proximate to track 101 and are coupled to the barrier. Pullies 119 may also be positioned proximately along curved portion 105 to prevent the cable from rubbing against the barrier. Pullies 119 are further depicted and described with regards to FIGS. 2 and 3.

Optionally, roping assembly 100 may have the drive motor assembly in communication with one or more sensors that transmit a signal to the drive motor assembly to engage, disengage, reverse, or brake the motor of the drive motor assembly. For example, in FIG. 1, stock 121 has stock gate 123 that temporarily houses steer 135. Stock 121 is a traditional stock. A stock is sometimes referred to as a squeeze chute generally known in the art of livestock pens. Stock 121 may have sensor 125 that detects and transmits a signal when gate 123 is opened. Responsive to opening gate 123, drive motor assembly 129a receives the signal from sensor 125 via network 127. While network 127 is depicted as a wired connection, it should be appreciated that sensor 125 and drive motor assembly 129a may alternatively communicate via wireless transmission.

Optionally, roping assembly 100 may have sensor 131 located proximate to straight portion 103b of track 101. Sensor 131 may be a sensor that detects when trolley 109 passes sensor 131, wherein upon detecting trolley 109 passing sensor 131, sensor 131 transmits a signal to a drive motor assembly (i.e., either or both drive motor assembly 129a and 129b). Responsive to receiving the signal from sensor 131, the drive motor assembly stops trolley 109 from translating. For example, responsive to receiving the signal, the drive motor assembly disengages (i.e., turns off) the drive motor and applies a brake to the motor to stop reeling the cable that is pulling trolley 109. The drive motor may have a braking force that is capable of stopping steer 135 from continuing along path 139.

Optionally, sensor 131 may be a mechanical device that decouples trolley 109 from steer 135, thereby releasing steer 137 from roping assembly 100. For example, sensor 131 may decouple end 113a of tether 111 from trolley 109, or decouple end 113b of tether 111 from horn wrap 137.

Optionally, roping assembly 100 may have sensor 133 located proximate to end 107b of track 101. Sensor 131 may be a sensor that detects when trolley 109 passes sensor 133, wherein upon detecting trolley 109 passing sensor 133, sensor 133 transmits a signal to the drive motor assembly. Responsive to receiving the signal from sensor 133, the drive motor assembly retracts trolley 109 from end 107b to end 107a.

Optionally, roping assembly 100 may have a drive motor assembly configured to pull trolley 109 such that trolley 109 leads steer 135 while trolley 109 translates from end 107a to end 107b. In other word the drive motor pulls trolley 109 so that trolley 109 is positionally ahead of steer 135 towards end 107b.

Referring now to FIG. 2, a detailed top view of end 107a of roping assembly 100 is depicted.

In this figure, trolley 109 is configured to translate along track 101 via rollers 147, wherein rollers 147 are roller bearings. In this figure, barrier 141 is coupled along track 101. Barrier 141 is any barrier that deters steer 135 from passing across track 101. For example, barrier 141 can be sheet metal, a structural wall, agricultural fencing, or livestock fencing. In this figure, pulley 119 is coupled to barrier 141.

In general, a plurality of posts are coupled to track 101 to structurally support track 101. In this figure, post 143 is coupled to track 101 and subsequently barrier 141. In this figure drive motor assembly 129 is proximate to end 107a by being coupled to post 143.

Referring now to FIG. 3, a detailed side view of end 107a of roping assembly 100 is depicted.

In this figure, drive motor assembly 129a comprises variable drive motor 149, motor shaft 151, and cable spool 153. While FIGS. 2 and 3 depict drive motor assembly 129a being coupled proximate to end 107a by being coupled to post 143, it should be appreciated that drive motor assembly 129b (having the same form and function as drive motor assembly 129a) can be coupled to a post located proximate to end 107b of track 101 in the same form and fashion as drive motor assembly 129a.

Optionally, each post of the plurality of posts may have a base member integrally connected to an end of each post to maintain vertical orientation of each post relative to a foundation (e.g., ground). In this figure, base member 145 is integrally connected to end 144 of post 145.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A team roping training assembly, comprising:
    a track having a curved portion, a first straight portion, and a second straight portion, the curved portion located between the first and the second straight portions;
    a barrier coupled along the track;
    a trolley coupled to the track, the trolley configured to translate along the track;
    a tether having a first end and a second end, the first end coupled to the trolley, the second end is configured to be coupled to a horn wrap of a steer
    a variable drive motor located proximate to an end of the track, the variable drive motor having a motor shaft;
    a cable spool coupled to the motor shaft, the cable spool in communication with the trolley;
    a plurality of pullies coupled to the barrier; and
    a sensor positioned proximate to the second straight portion of the track, wherein the sensors detects when the trolley passes the sensor, wherein upon detecting the trolley has passed the sensor, the sensor transmits a signal to the variable drive motor to stop the trolley from translating.

2. The assembly of claim 1, wherein the curved portion is a portion of a circular curve.

3. The assembly of claim 1, wherein the curved portion is a portion of an elliptical curve.

4. The assembly of claim 1, wherein the curved portion is a portion of a parabolic curve.

5. The assembly of claim 1, wherein the tether is configured to selectively decouple the horn wrap from the trolley.

6. The assembly of claim 5, wherein the tether decouples from the trolley.

7. The assembly of claim 5, wherein the tether decouples from the horn wrap.

8. The assembly of claim 1, further comprising a plurality of posts coupled to the track.

9. The assembly of claim 8, wherein each post of the plurality of posts further comprise a base member located at an end of each post.

10. The assembly of claim 1, wherein the variable drive motor is configured to pull the trolley such that the trolley leads the steer while the trolley translates from a first end to a second end of the track.

11. The assembly of claim 1, further comprising a sensor coupled to a stock, wherein the sensor determines when a stock gate of the stock is opened, wherein upon detecting the stock gate is open, the sensor transmits a signal to the variable drive motor to translate the trolley along the track from a first end to a second end.

12. The assembly of claim 1, wherein the variable drive motor stops the trolley from translating by disengaging the variable drive motor.

13. The assembly of claim 1, further comprising:
 a second variable drive motor located proximate to a second end of the track, the second drive motor having a motor shaft; and
 a second cable spool coupled to the motor shaft of the second variable drive motor, the second cable spool in communication with the trolley.

14. A team roping training assembly, comprising:
 a track having a curved portion, a first straight portion, and a second straight portion, the curved portion located between the first and the second straight portions;
 a barrier coupled along the track;
 a trolley coupled to the track, the trolley configured to translate along the track;
 a tether having a first end and a second end, the first end coupled to the trolley, the second end is configured to be coupled to a horn wrap of a steer
 a variable drive motor located proximate to an end of the track, the variable drive motor having a motor shaft;
 a cable spool coupled to the motor shaft, the cable spool in communication with the trolley;
 a plurality of pullies coupled to the barrier; and
 a sensor coupled to a stock, wherein the sensor determines when a stock gate of the stock is opened, wherein upon detecting the stock gate is open, the sensor transmits a signal to the variable drive motor to translate the trolley along the track from a first end to a second end.

* * * * *